US009286245B2

(12) United States Patent
Durham et al.

(10) Patent No.: US 9,286,245 B2
(45) Date of Patent: Mar. 15, 2016

(54) HARDWARE ENFORCED MEMORY ACCESS PERMISSIONS

(75) Inventors: David M. Durham, Beaverton, OR (US); Ravi L. Sahita, Portland, OR (US); Prashant Dewan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 13/995,360

(22) PCT Filed: Dec. 30, 2011

(86) PCT No.: PCT/US2011/068192
§ 371 (c)(1),
(2), (4) Date: Jun. 18, 2013

(87) PCT Pub. No.: WO2013/101208
PCT Pub. Date: Jul. 4, 2013

(65) Prior Publication Data
US 2014/0041033 A1 Feb. 6, 2014

(51) Int. Cl.
G06F 21/00 (2013.01)
G06F 12/14 (2006.01)
G06F 21/50 (2013.01)
G06F 21/12 (2013.01)
G06F 21/79 (2013.01)

(52) U.S. Cl.
CPC .......... *G06F 12/1458* (2013.01); *G06F 21/121* (2013.01); *G06F 21/50* (2013.01); *G06F 21/79* (2013.01)

(58) Field of Classification Search
CPC ....... G06F 21/121; G06F 21/50; G06F 21/51; G06F 21/52; G06F 21/70
See application file for complete search history.

(56) References Cited

U.S. PATENT DOCUMENTS

| 5,581,722 A | 12/1996 | Welland |
| 6,353,879 B1 | 3/2002 | Middleton et al. |
| 2004/0148480 A1 | 7/2004 | Watt et al. |
| 2006/0206687 A1 | 9/2006 | Vega |
| 2007/0180210 A1 | 8/2007 | Thibadeau |
| 2008/0040565 A1* | 2/2008 | Rozas et al. ................. 711/163 |
| 2008/0077765 A1* | 3/2008 | Illikkal et al. ................. 711/202 |
| 2011/0010483 A1* | 1/2011 | Liljeberg ........................ 711/6 |
| 2011/0131402 A1 | 6/2011 | Mittal |

FOREIGN PATENT DOCUMENTS

| TW | 200412105 A | 7/2004 |
| TW | 201115334 A | 5/2011 |
| WO | 2013101208 A1 | 7/2013 |

OTHER PUBLICATIONS

International Preliminary Report on Patentability received for International Application No. PCT/US2011/068192, mailed on Jul. 10, 2014, 6 pages.
International Search Report and Written Opinion received for International Application No. PCT/US2011/068192, mailed on Sep. 25, 2012, 11 pages.
Office Action Received for Taiwanese Patent Application No. 101150509, mailed on Nov. 11, 2014, 8 Pages of Taiwanese Office Action and 8 Pages of English Translation.

* cited by examiner

*Primary Examiner* — Edward Zee
(74) *Attorney, Agent, or Firm* — Thomas R. Lane

(57) ABSTRACT

Embodiments of apparatuses and methods for hardware enforced memory access permissions are disclosed. In one embodiment, a processor includes address translation hardware and memory access hardware. The address translation hardware is to support translation of a first address, used by software to access a memory, to a second address, used by the processor to access the memory. The memory access hardware is to detect an access permission violation.

12 Claims, 2 Drawing Sheets

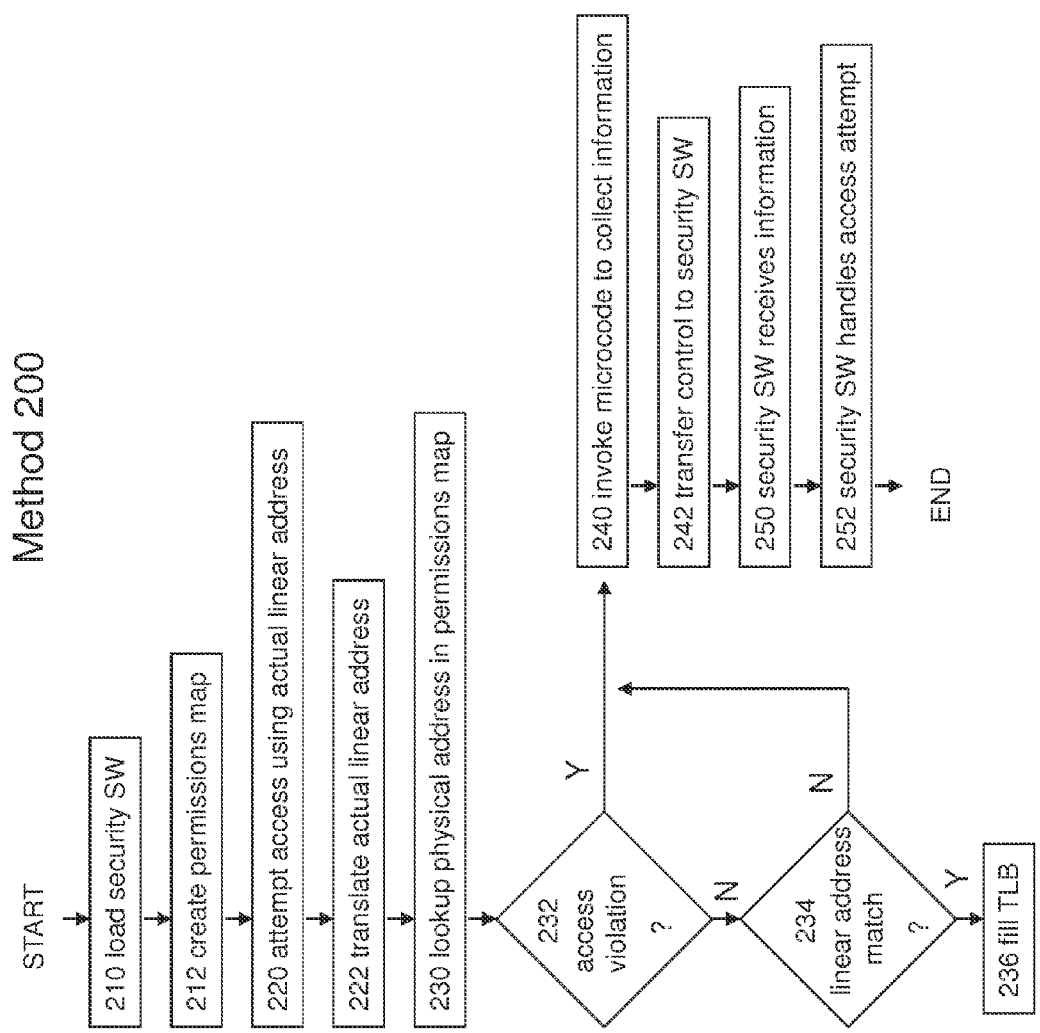

HARDWARE ENFORCED MEMORY ACCESS PERMISSIONS

BACKGROUND

1. Field

The present disclosure pertains to the field of information processing, and more particularly, to the field of security in information processing systems.

2. Description of Related Art

Many malware attacks on information processing systems involve the manipulation of memory. For example, an attack may involve storing malicious code or data in memory, then exploiting bugs and/or buffer overflows while running legitimate programs to transfer control to the malicious code to use the malicious data. Although existing security techniques provide for including access permissions in data structure entries used for translating virtual, linear, and logical memory addresses to physical memory addresses, malware may corrupt these data structures to circumvent these access permissions.

BRIEF DESCRIPTION OF THE FIGURES

The present invention is illustrated by way of example and not limitation in accompanying figures.

FIG. 2 illustrates a method for hardware enforced memory access permissions according to an embodiment of the present invention.

DETAILED DESCRIPTION

Figure 1:
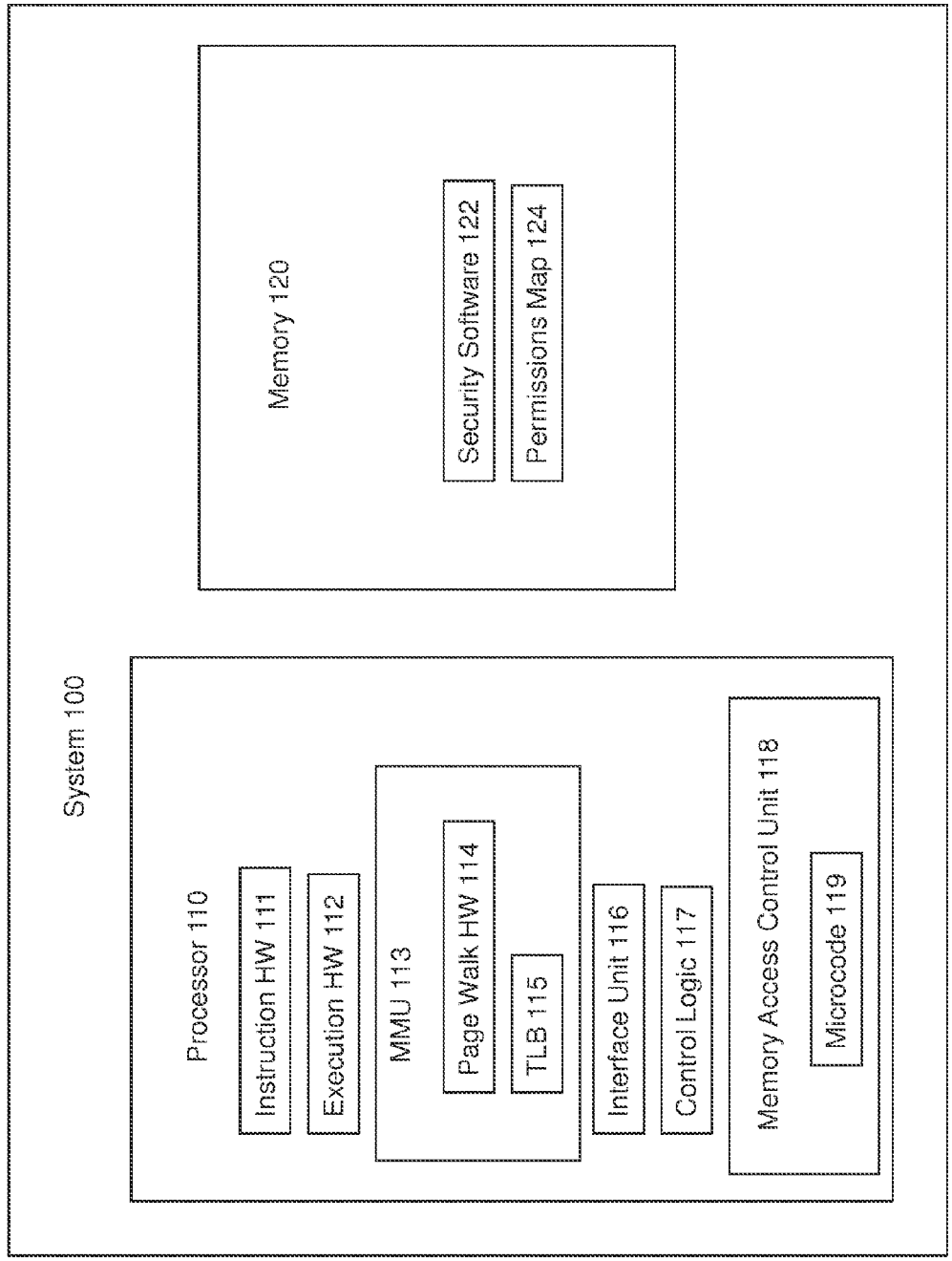
FIG. 1 illustrates an information processing system in which an embodiment of the present invention may be present and/or operate.

Embodiments of apparatuses, methods, and systems for hardware enforced memory access permissions are described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention may be used for enforcing memory access permissions to assist in preventing malware from corrupting memory. Techniques according to embodiments of the present invention may be implemented within any approach to memory management, including page-based memory management data structures, nested page-based memory management data structures used by virtualization technologies, and parallel access data structures. Furthermore, embodiments of the present invention may be used together with other approaches to information processing security, such as techniques to partition system memory to provide isolated or protected execution environments for different application programs.

FIG. 1 illustrates system 100, an information processing system in which an embodiment of the present invention may be present and/or operate. System 100 may represent any type of information processing system, such as a server, a desktop computer, a portable computer, a set-top box, a hand-held device, or an embedded control system. System 100 includes processor 110 and memory 120. Systems embodying the present invention may include number of each of these components and any other components or other elements. Any or all of the components or other elements in any system embodiment may be connected, coupled, or otherwise in communication with each other through any number of buses, point-to-point, or other wired or wireless connections.

Processor 110 may represent any type of processor, including a general purpose microprocessor, such as a processor in the Core® Processor Family, or other processor family from Intel Corporation, or another processor from another company, or any other processor for processing information according to an embodiment of the present invention. Processor 110 may include any number of execution cores and/or support any number of execution threads, and therefore may represent any number of physical or logical processors, and/or may represent a multi-processor component or unit.

Processor 110 supports execution of software at different privilege levels, according to any known approach. For example, processor 110 may recognize four privilege levels, which may be labeled zero to four, where the higher number means less privilege. The four privilege levels may be pictured as rings of protection, with privilege level zero, in the center, intended for executing operating system ("OS") kernel level code, levels one and two intended for executing OS services code, and level four, the outermost ring, intended for executing application code.

Memory 120 may represent any static or dynamic random access memory, semiconductor-based read only or flash memory, magnetic or optical disk memory, any other type of medium accessible by processor 110 and/or other elements of system 100, or any combination of such mediums. Memory 120 may represent a system memory in which data and instructions, including operating system instructions, virtual machine monitor instructions, and application program instructions may be stored. Embodiments of the present invention may provide for security software 122 and permissions map 124, described below, to be stored in memory 120.

Processor 110 may include instruction hardware 111, execution hardware 112, memory management unit ("MMU") 113, interface unit 116, control logic 117, and memory access control unit 118, plus any other units or elements.

Instruction hardware 111 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution hardware 112.

Execution hardware 112 may include any circuitry, structure, or other hardware, such as an arithmetic unit, logic unit, floating point unit, shifter, etc., for processing data and executing instructions, micro-instructions, and/or micro-operations.

MMU 113 may include any circuitry, structure, or other hardware for translating addresses referring locations in memory 120. MMU 113 may perform address translations, for example, the translation of a logical or linear address to a physical address, according to any known memory management technique, as part of a memory management technique to provide processor 110 with a virtual address space that is larger than the size of memory 120. To perform address translations, MMU 113 may refer to one or more data structures stored in processor 110, memory 120, any other storage location in system 100 not shown in FIG. 1, and/or any combination of these components and locations. The data structures may include page directories and page tables according to the architecture of the Core® Processor Family, and may include access permissions (e.g., read, write, and execute) that may be used to restrict access to memory based on the type of access. In other embodiments, other address translation techniques may be used.

In one embodiment, MMU 113 receives a linear address provided by an instruction to be executed and/or of data to be fetched by processor 110. MMU 113 uses portions of the linear address as indices into hierarchical tables, including page tables. The page tables contain entries, each including a field for a base address of a page in memory 120. Any page size (e.g., 4 kilobytes) may be used within the scope of the present invention. Therefore, the linear address used by a program to access memory 120 may be translated to a physical address used by processor 110 to access memory 120. Address translation may involve addition complexities, such as would be the case for the translation of a linear address used by guest software within a virtual machine to a physical address used by host software such as a virtual machine monitor to access memory 120. Any level or number of levels of translation may he required; for example, in a virtualization architecture, a guest virtual address may be translated to a guest physical address which may be translated to a host physical address. For convenience, any address to be translated may be referred to as a linear address.

MMU 113 may include page walk hardware 114 for traversing the hierarchy of the paging data structure from a linear address to a physical address, and translation lookaside buffer 115 for storing address translations and provide for the paging data structure to be bypassed.

Interface unit 116 may represent any circuitry, structure, or other hardware, such as a bus unit or any other unit, port, or interface, to allow processor 110 to communicate with other components in system 100 through any type of bus, point to point, or other connection, directly or through any other component, such as a memory controller or a bus bridge.

Control logic 117 may represent microcode, programmable logic, hard-coded logic, or any other type of logic to control the operation of the units and other elements of processor 110 and the transfer of data within, into, and out of processor 110. Control logic 117 may cause processor 110 to perform or participate in the performance of method embodiments of the present invention, such as the method embodiments described below, for example, by causing processor 110 to execute instructions received by instruction hardware 112 and micro-instructions or micro-operations derived from instructions received by instruction hardware 112.

Memory access control unit 118 may include any circuitry, structure, or other hardware, configured according to embodiments of the present invention to support the enforcement of access permissions and the detection of potential attempts to violate access permissions. Memory access control unit 118 may include control logic (e.g., microcode 119), as described below. Memory access control unit 118 may be included, all or in part, within other described or depicted units of processor 110, such as MMU 113 and control logic 117, for illustrative purposes. Furthermore, memory access control unit 118 may work in connection with other hardware, firmware, software, and/or data structures to assist in the enforcement of access permissions and to perform other actions according to embodiments of the invention further described below. For example, a data structure referred to and depicted as permissions map 124 may be used by memory access control unit 118 to enforce access permissions.

FIG. 2 illustrates method 200 for enforcing memory access permissions according to an embodiment of the present invention. The description of FIG. 2 may refer to elements of FIG. 1, but method 200 and other method embodiments of the present invention are not intended to be limited by these references.

In box 210, security software 122 may be authenticated and loaded into a memory partition that is isolated or protected according to any known approach, to run at the highest privilege level on processor 110 (e.g., ring 0).

In box 212, permissions map 124 is created or updated. Permissions map 124 may include any number of entries locations. Each entry location may have a physical address field to store a value to identify a portion of memory 120 (e.g., the base address of a page), a linear address field to store a value to identify a linear address or address range which is expected to correspond to the value in the entry's physical address field, and any number of permission bits or fields to store values of access permission attributes (e.g., read, write, execute) to the corresponding portion of memory. In one embodiment, permissions map 124 may be created by security software 122, and updated with new or modified entries by security software 122, operating system software, or a virtual machine monitor when page tables are created or modified by the operating system software or the virtual machine monitor.

In box 220, an access memory 120 using a linear address not found in TLB 115 is attempted. The attempt may be made by any software, firmware, or device, including basic input/output system code, operating system code, virtual machine monitor code, application software code, and malware. In box 222, MMU 113 may translate the linear address to a physical address, for example, using page walk hardware 114, If any access permissions associated with the physical address in any translation data structure used for the translation (e.g., page directory, page table, etc.) are violated, the access to the physical address may be prevented by a page fault or other such event.

In box 230, memory access control unit 118 may look up, in permissions map 124, the physical address found in box 222. In box 232, the access permissions found in permissions map 124 are used to determine if the access is allowed. If so, method 200 continues in box 234; if not, method 200 continues in box 240. In box 234, the linear address found in permissions map 124 (the "expected linear address") is compared to the linear address from box 220 (the "actual linear address"). If the actual linear address matches the expected linear address, method 200 continues in box 236; if not, method 200 continues in box 240. In box 236, the address translation from box 222 is added to TLB 115, along with access filters and/or access permissions corresponding to the access permissions from the translation data structures and/or permissions map 124.

In box 240, a permissions violation from box 232 or a linear address mismatch from box 234 results in control logic in memory access control unit 118 (e.g., microcode 119) being invoked to collect information regarding the attempted access, for example, the actual linear address, the expected linear address, and the physical page. In box 242, microcode 119 transfers execution control to security software 122.

In box 250, security software 122 receives the information collected in box 240. In box 252 security software 122 handles the access attempt according to a system security policy. Box. 252 may include attempting to determine whether the access was made in connection with a malware attack, modifying the access permissions in the translation data structures, modifying the permissions map, adding the actual linear address to the permissions map, and/or restarting the access.

Within the scope of the present invention, the method illustrated in FIG. 2 may be performed in a different order, with illustrated boxes omitted, with additional boxes added, or with a combination of reordered, omitted, or additional boxes.

Thus, apparatuses, methods, and systems for hardware enforced memory access permissions have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
    page walk hardware to traverse a hierarchy of page tables to perform an address translation of an actual linear address to a physical address, wherein the actual linear address is used by software to access a memory and the physical address is used by the processor to access the memory;
    a translation lookaside buffer to store a plurality of address translations performed by the page walk hardware; and
    memory access control hardware to look up, in a permissions map separate from the hierarchy of page tables, the physical address from the page walk hardware to find access permissions and an expected linear address, compare the expected linear address to the actual linear address, and store the address translation and the access permissions in the translation lookaside buffer only if the expected linear address matches the actual linear address.

2. The processor of claim 1, wherein the memory access control hardware is also to respond to an access permission violation by invoking microcode to collect information regarding an attempted access.

3. A method comprising:
    performing, by page walk hardware in a processor, an address translation of an actual linear address to a physical address by traversing a hierarchy of page tables, where the actual linear address is used by software to access a memory and the physical address is used by the processor to access a memory; and
    looking up, by memory access control hardware in the processor, the physical address in a permissions map separate from the hierarchy of page tables to find access permissions and an expected linear address;
    comparing, by the memory access control hardware in the processor, the expected linear address to the actual linear address; and
    storing the address translation and the access permissions in a translation lookaside buffer in the processor only if the expected linear address matches the actual linear address.

4. The method of claim 3, further comprising creating, by security software, the permissions map.

5. The method of claim 4, wherein the security software runs at the highest privilege level on the processor.

6. The method of claim 4, further comprising responding to an access permission violation by invoking microcode to collect information regarding an attempted access.

7. The method of claim 6, further comprising transferring, by the microcode, control of the processor to the security software.

8. The method of claim 7, further comprising modifying, by the security software, the permissions map.

9. The method of claim 8, further comprising restarting, by the security software, the access.

10. A system comprising:
    a memory; and
    a processor including
        page walk hardware to traverse a hierarchy of page tables to perform an address translation of an actual linear address to a physical address, wherein the actual linear address is used by software to access a memory and the physical address is used by the processor to access the memory;
        a translation lookaside buffer to store a plurality of address translations performed by the page walk hardware; and
        memory access control hardware to look up, in a permissions map separate from the hierarchy of page tables, the physical address from the page walk hardware to find access permissions and an expected linear address, compare the expected linear address to the actual linear address, and store the address translation and the access permissions in the translation lookaside buffer only if the expected linear address matches the actual linear address.

11. The system of claim 10, wherein the memory is to store the permissions map.

12. The system of claim 10, wherein the permissions map is created by security software running at the highest privilege level on the processor.

* * * * *